(12) United States Patent
Wei et al.

(10) Patent No.: US 10,921,192 B2
(45) Date of Patent: Feb. 16, 2021

(54) PLANE SOURCE BLACKBODY

(71) Applicants: Tsinghua University, Beijing (CN); HON HAI PRECISION INDUSTRY CO., LTD., New Taipei (TW)

(72) Inventors: Yang Wei, Beijing (CN); Guang Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/198,606

(22) Filed: Nov. 21, 2018

(65) Prior Publication Data

US 2019/0212204 A1 Jul. 11, 2019

(30) Foreign Application Priority Data

Jan. 11, 2018 (CN) .......................... 201810026965.6

(51) Int. Cl.
*G01J 5/52* (2006.01)

(52) U.S. Cl.
CPC .................................. *G01J 5/522* (2013.01)

(58) Field of Classification Search
None
See application file for complete search history.

(56) References Cited

U.S. PATENT DOCUMENTS

| 8,741,422 | B2 | 6/2014 | Miao |
| 2008/0192797 | A1 | 8/2008 | Ko et al. |
| 2009/0085461 | A1 | 4/2009 | Feng et al. |
| 2009/0096348 | A1 | 4/2009 | Liu et al. |
| 2009/0321420 | A1 | 12/2009 | Feng et al. |
| 2011/0108545 | A1* | 5/2011 | Wang ..................... H05B 3/283 |
| | | | 219/546 |
| 2011/0217451 | A1 | 9/2011 | Veerasamy |
| 2011/0315882 | A1 | 12/2011 | Hu et al. |
| 2012/0104213 | A1 | 5/2012 | Feng et al. |
| 2012/0312773 | A1 | 12/2012 | Cheng et al. |
| 2013/0295320 | A1 | 11/2013 | Araki |

(Continued)

FOREIGN PATENT DOCUMENTS

| CN | 101400198 | 4/2009 |
| CN | 101409961 | 4/2009 |
| CN | 102452647 | 5/2012 |

(Continued)

OTHER PUBLICATIONS

Shimizu et al., Blackbody Thermal Radiator with Vertically Alighned Carbon Nanotube Coating, Japanese Journal of Applied Physics, May 15, 2014, 068004-1~068004-3.

(Continued)

*Primary Examiner* — James Choi
(74) *Attorney, Agent, or Firm* — ScienBiziP, P.C.

(57) ABSTRACT

A plane source blackbody is provided. The plane source blackbody comprises a panel, a black lacquer, and a carbon nanotube layer. The panel comprises a first surface and a second surface, and the first surface is opposite to the second surface. The black lacquer is located on the first surface. The carbon nanotube layer is located on a surface of the black lacquer away from the first surface. A method of making the plane source blackbody is also provided.

18 Claims, 6 Drawing Sheets

(56) References Cited

U.S. PATENT DOCUMENTS

2015/0367557 A1 12/2015 Wei et al.
2016/0268017 A1* 9/2016 Kitamura ................ H01B 1/24

FOREIGN PATENT DOCUMENTS

| | | |
|---|---|---|
| CN | 103382023 | 11/2013 |
| CN | 103602132 | 2/2014 |
| CN | 105197875 | 12/2015 |
| CN | 105562307 | 5/2016 |
| CN | 105675143 | 6/2016 |
| CN | 107014494 | 8/2017 |
| JP | 2015-203589 | 11/2015 |
| JP | 2017-3565 | 1/2017 |
| JP | 2017-24942 | 2/2017 |
| KR | 100478079 B1 * | 3/2005 |
| KR | 20160024565 A * | 3/2016 |
| TW | 200834046 | 8/2008 |
| TW | 201125419 | 7/2011 |
| TW | 201144217 | 12/2011 |
| TW | 201250720 | 12/2012 |
| TW | I410615 | 10/2013 |
| TW | I486090 | 5/2015 |
| TW | 201625937 | 7/2016 |
| WO | WO-2016081293 A1 * | 5/2016 ............. G01J 5/522 |
| WO | 2016/107883 | 7/2016 |

OTHER PUBLICATIONS

Lim Zhi Han, Investigation of Laser-Carbon Nanotubes Interaction and Development of CNT-Based Devices, Ph.D Theses, Oct. 12, 2010, Check(https://scholar.google.com/scholar?as_q=&as_epq=Investigation of Laser-Carbon Nanotubes Interaction and Development of CNT-Based Devices&as_occt=any).

Kohei Mizuno et al., A Black Body Absorber from Vertically Aligned Single-walled Carbon Nanotubes, PNAS, Apr. 14, 2009, 6044-6047, vol. 106, No. 15.

Zhao Jun Han et al., Large-Diameter Single-Walled Carbon Nanotubes, J. Am. Chem. Soc., Mar. 12, 2012, 6018-6024, 134, 13.

Kohei Mizuno et al. A black body absorber from vertically aligned single-walled carbon nanotubes, Proceedings of the Natinal Academy of Sciences, Apr. 14, 2009, vol. 106, 6044-6047.

* cited by examiner

PLANE SOURCE BLACKBODY

CROSS-REFERENCE TO RELATED APPLICATIONS

This application claims all benefits accruing under 35 U.S.C. § 119 from China Patent Application No. 201810026965.6, filed on Jan. 11, 2018, in the China Intellectual Property Office, the contents of which are hereby incorporated by reference. The application is also related to copending applications entitled, "CAVITY BLACKBODY RADIATION SOURCE AND METHOD OF MAKING THE SAME", filed Nov. 21, 2018, Ser. No. 16/198,549. The application is also related to copending applications entitled, "CAVITY BLACKBODY RADIATION SOURCE", filed Nov. 21, 2018, Ser. No. 16/198,565. The application is also related to copending applications entitled, "PLANE SOURCE BLACKBODY", filed Nov. 21, 2018, Ser. No. 16/198,577. The application is also related to copending applications entitled, "CAVITY BLACKBODY RADIATION SOURCE AND METHOD OF MAKING THE SAME", filed Nov. 21, 2018, Ser. No. 16/198,590. The application is also related to copending applications entitled, "CAVITY BLACKBODY RADIATION SOURCE AND METHOD OF MAKING THE SAME", filed Nov. 21, 2018, Ser. No. 16/198,598. The application is also related to copending applications entitled, "PLANE SOURCE BACKBODY", filed Jan. 10, 2019, Ser. No. 16/244,449. The application is also related to copending applications entitled, "BLACKBODY RADIATION SOURCE", filed Jan. 10, 2019, Ser. No. 16/244,455. The application is also related to copending applications entitled, "BLACKBODY RADIATION SOURCE", filed Jan. 10, 2019, Ser. No. 16/244,468. The application is also related to copending applications entitled, "BLACKBODY RADIATION SOURCE", filed Jan. 10, 2019, Ser. No. 16/244,474. The application is also related to copending applications entitled, "BLACKBODY RADIATION SOURCE", filed Jan. 10, 2019, Ser. No. 16/244,481. The application is also related to copending applications entitled, "PLANE SOURCE BLACKBODY", filed Jan. 10, 2019, Ser. No. 16/244,488.

FIELD

The present disclosure relates to a blackbody radiation source, especially relates to a plane source blackbody.

BACKGROUND

With a rapid development of infrared remote sensing technology, the infrared remote sensing technology is widely used in military and civilian fields, such as earth exploration, weather forecasting, and environmental monitoring. However, all infrared detectors need to be calibrated by a blackbody before they can be used. The higher an emissivity of the blackbody, the higher an accuracy of a calibration of the infrared detector. Blackbody includes cavity blackbody and plane source blackbody. An effective emissivity of the plane source blackbody mainly depends on a surface structure and an a surface material emissivity of the plane source blackbody. Therefore, selecting high emissivity intracavity surface materials has a great significance for obtaining high performance plane source blackbody.

DESCRIPTION OF THE DRAWINGS

Implementations of the present technology will now be described, by way of example only, with reference to the attached figures, wherein.

DETAILED DESCRIPTION

Figure 1:
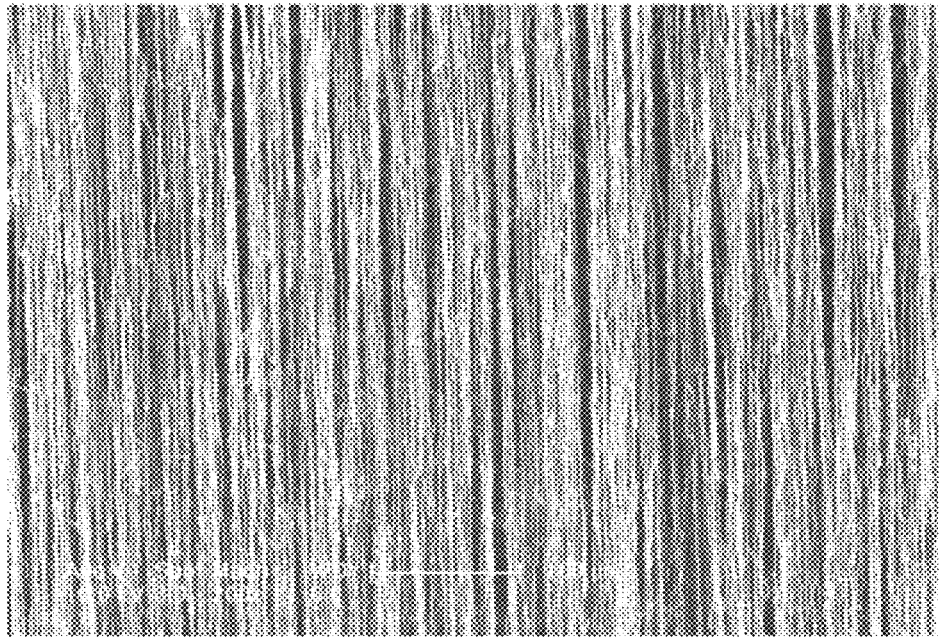
FIG. 1 is a scanning electron microscope (SEM) image of a drawn carbon nanotube film.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting e scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

The disclosure is described in relation to a plane source blackbody. The plane source blackbody comprises a panel, a black lacquer, and a carbon nanotube layer. The panel comprises a first surface and a second surface opposite to the first surface. The black lacquer is located on the first surface. The carbon nanotube layer is located on a surface of the black lacquer away from the first surface. The carbon nanotube layer comprises at least one carbon nanotube film. The black lacquer has high emissivity, such as Pyromark 1200 black lacquer having an emissivity 0.92, Nextel Velvet 811-21 black lacquer having an emissivity 0.95.

The panel is made of a material resistant to high temperature and having a high emissivity. The panel can be made of hard aluminum material, aluminum alloy material or oxygen-free copper.

In one embodiment, the plane source blackbody further comprises a heating element. In one embodiment, the heating element comprises a carbon nanotube structure.

The at least one carbon nanotube film of the carbon nanotube layer 12 can be a drawn carbon nanotube film, a flocculated carbon nanotube film or a pressed carbon nanotube film. When the carbon nanotube layer comprises only one carbon nanotube film, the carbon nanotube layer comprises one drawn carbon nanotube film, one flocculated carbon nanotube film, or one pressed carbon nanotube film. When the carbon nanotube layer comprises at least two carbon nanotube films, the carbon nanotube layer comprises at least two films of the drawn carbon nanotube film, the flocculated carbon nanotube film, and the pressed carbon nanotube film stacked with each other.

The drawn carbon nanotube film is directly drawn from a super-aligned carbon nanotube array. Examples of a method of drawing the drawn carbon nanotube film is taught by US patent application US 20080248235 A1 to Feng et al.

FIG. 1 illustrates the drawn carbon nanotube film including a number of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals force, to form a free-standing film. A minority of carbon nanotubes in the drawn carbon nanotube film may be randomly aligned. However, the number of randomly aligned carbon nanotubes is very small and does not affect the overall oriented alignment of the majority of carbon nanotubes in the drawn carbon nanotube film.

The majority of the carbon nanotubes in the drawn carbon nanotube film substantially aligned along the same direction may not be exactly straight, and can be curved to a certain degree, or are not exactly aligned along the overall aligned direction, and can deviate from the overall aligned direction by a certain degree. Therefore, partial contacts can exist between the randomly aligned carbon nanotubes and adjacent carbon nanotubes.

The drawn carbon nanotube film includes a plurality of successively oriented carbon nanotube segments joined end-to-end by van der Waals force. Each carbon nanotube segment includes a plurality of carbon nanotubes substantially parallel to each other, combined together by van der Waals force. A plurality of microporous can be formed among the plurality of carbon nanotubes.

When the carbon nanotube layer comprises at least two carbon nanotube films, an angle is formed between the carbon nanotubes of adjacent two carbon nanotube drawn films. The angle ranges from 0° to 90°. The number of the drawn carbon nanotube films of the carbon nanotube layer is not limited. In one embodiment, the carbon nanotube layer comprises ten drawn carbon nanotube films stacked with each other, and the carbon nanotubes of adjacent drawn carbon nanotube films are vertically crossed to form a plurality of micropores.

Figure 2:
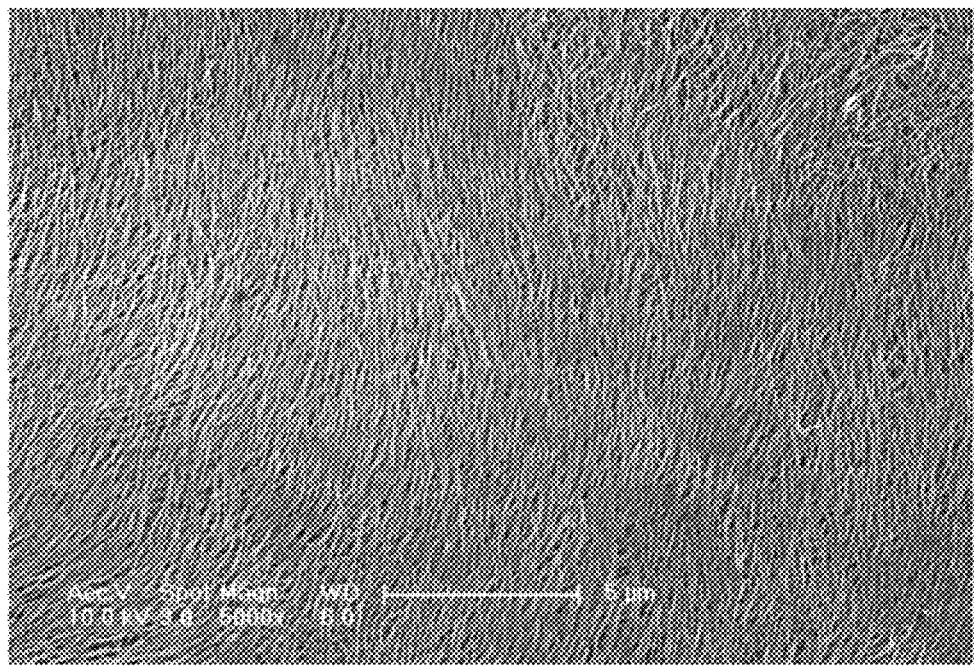
FIG. 2 is an SEM image of a pressed carbon nanotube film comprising a plurality of carbon nanotubes arranges along a same direction.
Figure 3:
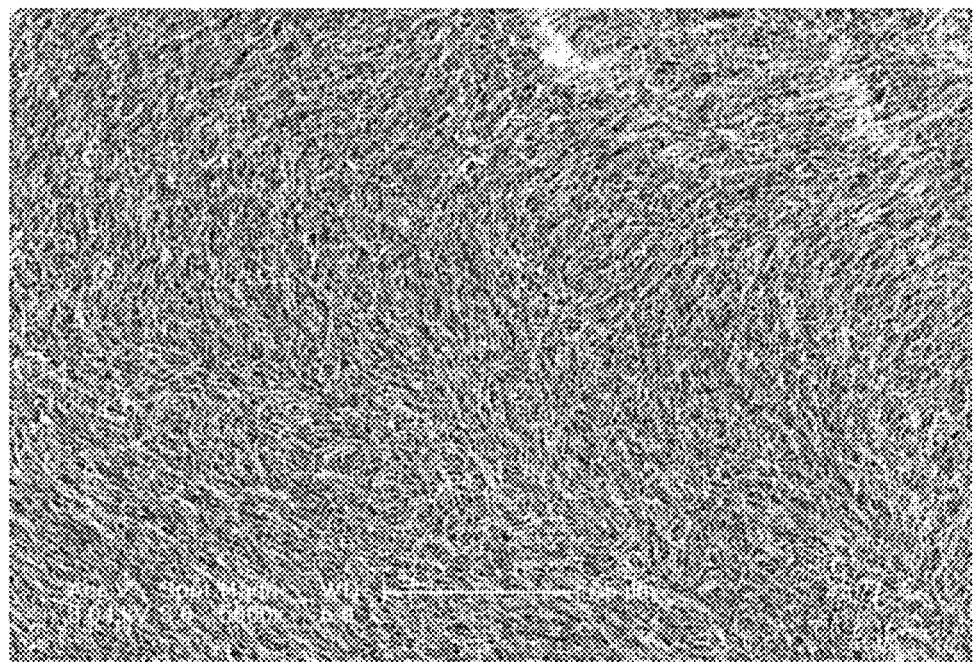
FIG. 3 is an SEM image of a pressed carbon nanotube film comprising a plurality of carbon nanotubes arranges along different directions.

FIG. 2 and FIG. 3 illustrate a pressed carbon nanotube film which can include a number of carbon nanotubes isotropically arranged along a same or different directions. Adjacent carbon nanotubes are attracted to each other and combined by van der Waals force. A planar pressure head can be used to press the carbon nanotubes array along a direction perpendicular to a substrate; thereby a pressed carbon nanotube film having a plurality of isotropically arranged carbon nanotubes can be obtained. A roller-shaped pressure head can be used to press the carbon nanotubes array along a fixed direction, thereby a pressed carbon nanotube film having a plurality of carbon nanotubes aligned along a fixed direction is obtained. The roller-shaped pressure head can also be used to press the array of carbon nanotubes along different directions, thereby a pressed carbon nanotube film having a plurality of carbon nanotubes aligned along different directions is obtained. Examples of pressed carbon nanotube films are taught by US PGPub. 20080299031A1 to Liu et al.

An area and a thickness of pressed carbon nanotube film can be selected according to actual needs. The area of the pressed carbon nanotube film is substantially the same as a size of the carbon nanotube array. The thickness of the pressed carbon nanotube film is related to a height of the carbon nanotube array and a pressure of the rolling. The thickness of the pressed carbon nanotube film can range from about 1 micrometer to about 1 millimeter. The higher the height of the carbon nanotube array and the lower the pressure of the rolling, the larger the thickness of the pressed carbon nanotube film, on the contrary is also true. Gaps are formed between adjacent carbon nanotubes of the pressed carbon nanotube film, thus the pressed carbon nanotube film comprises a plurality of micropores. An aperture of each of the micropores is less than 10 microns.

Figure 4:
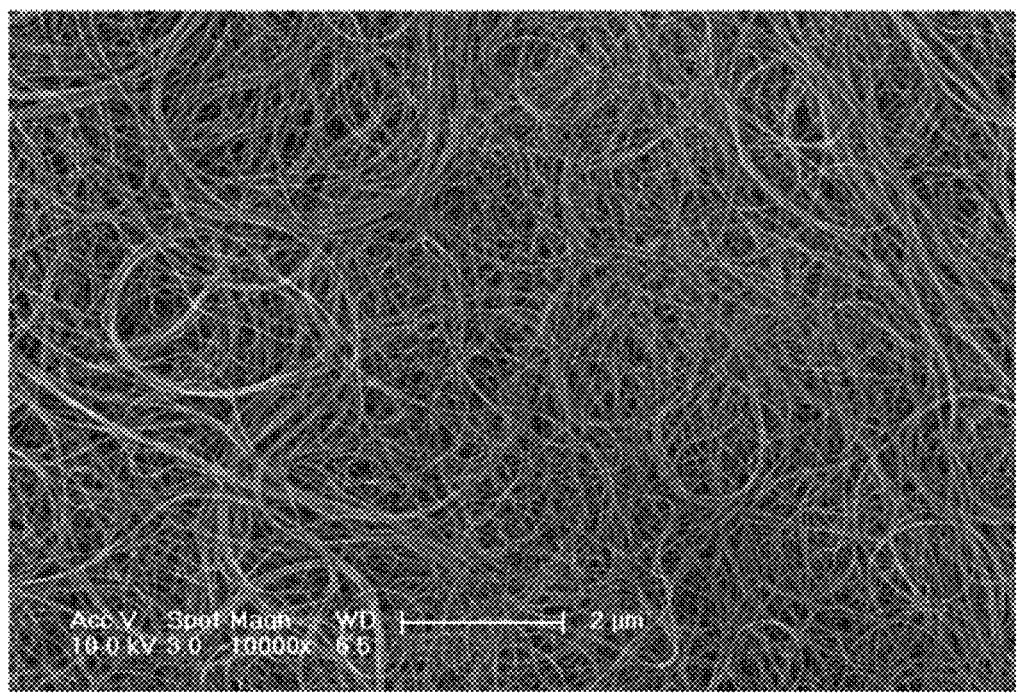
FIG. 4 is an SEM image of a flocculated carbon nanotube film.

FIG. 4 illustrates the flocculated carbon nanotube film includes a plurality of carbon nanotubes entangled with each other to form a network structure. A length of each of the plurality of carbon nanotubes is larger than 10 micrometers. In one embodiment, the length of each of the plurality of carbon nanotubes is larger than or equal to 200 micrometers and less than or equal to 900 micrometers. The carbon nanotubes can be substantially uniformly distributed in the flocculated carbon nanotube film. The flocculated carbon nanotube film comprises a plurality of micropores. An aperture of each of the micropores is less than 10 microns. The plurality of carbon nanotubes of the flocculated carbon nanotube film are entangled with each other, therefore, the flocculated carbon nanotube film has good flexibility and is a free-standing film. The free-standing film can be bent into any shape without breaking. An area and a thickness of the flocculated carbon nanotube film can be selected according to actual needs. The thickness of the flocculated carbon nanotube film can range from about 1 micrometer to about 1 millimeter. In one embodiment, the thickness of the flocculated carbon nanotube film is about 1 micrometer. The flocculated carbon nanotube film can be formed by flocculating the carbon nanotube array. Examples of the flocculated carbon nanotube film are taught by U.S. Pat. No. 8,808,589 to Wang et al.

Figure 5:
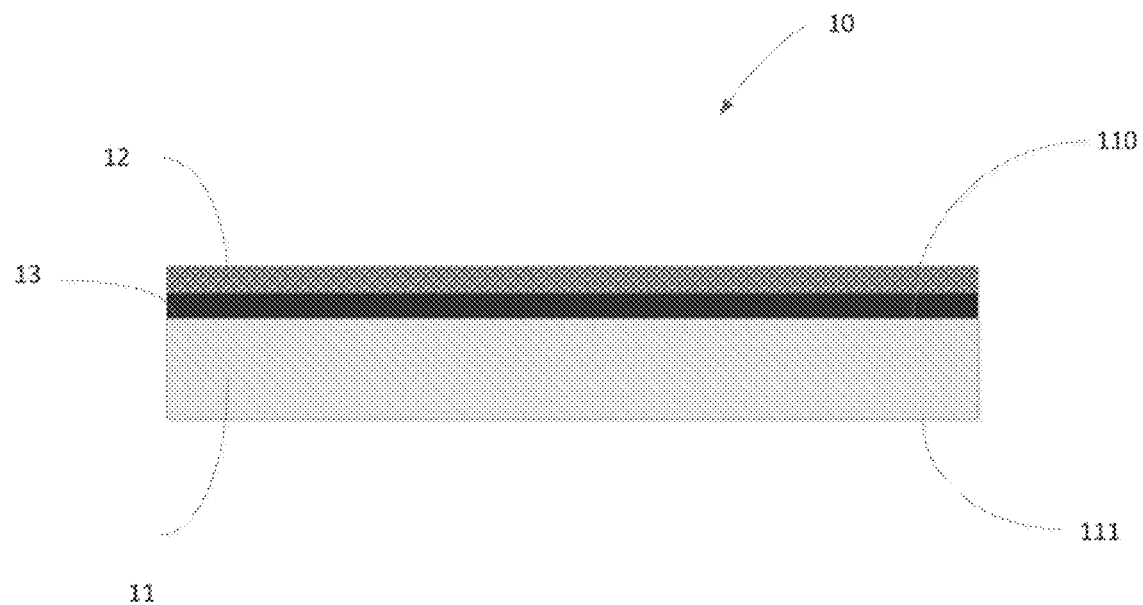
FIG. 5 is a section structure diagram of one embodiment of a plane source blackbody.

In FIG. 5, one embodiment is described in relation to a plane source blackbody 10. The plane source blackbody 10 comprises a panel 11, a carbon nanotube layer 12 and a black lacquer 13. The panel 11 comprises a first surface 110 and a second surface 111 opposite to the first surface 110. The black lacquer 13 is located on the first surface 110. The carbon nanotube layer 12 is located on a surface of the black lacquer 13 away from the first surface 110.

The panel is a flat structure. A material of the panel 11 is an aluminum alloy. The black lacquer 13 is the Nextel Velvet 811-21 black lacquer. The carbon nanotube layer 12 comprises ten drawn carbon nanotube films stacked with each other, and the carbon nanotubes in adjacent drawn carbon nanotube films are vertically crossed to form a plurality of micropores.

The plane source blackbody 10 further comprises a heating element. The heating element comprises the carbon nanotube structure, a first electrode and a second electrode, the first electrode and the second electrode are located on a surface of the carbon nanotube structure and spaced apart from each other. The carbon nanotube structure is located on the second surface of the panel 11. The carbon nanotube structure comprises at least one carbon nanotube film or at least one carbon nanotube wire. The carbon nanotube structure comprises a plurality of carbon nanotubes connected end to end and arranged in a preferred orientation. The plurality of carbon nanotubes of the carbon nanotube structure extends from the first electrode to the second electrode.

Because the carbon nanotube structure is located on the second surface of the panel 11, after the carbon nanotube structures energized by the first electrode and the second electrode, the carbon nanotube structure can heat the whole panel 11. So that a temperature field of the panel 11 is evenly distributed, the temperature stability and uniformity of the plane source blackbody 10 can be improved. Since carbon nanotube has small density and light weight, using the carbon nanotube structure as the heating element allows the plane source blackbody 10 to have a lighter weight. Since carbon nanotubes have high electrothermal conversion efficiency and low thermal resistance, and the carbon nanotube structure has small resistance; using the carbon nanotube structure to heat the panel 11 has the characteristics of rapid temperature rise, small thermal hysteresis and fast heat exchange rate. Carbon nanotubes have good toughness, thus the plane source blackbody 10 using the carbon nanotube structure as heating element have a long service life.

Figure 6:
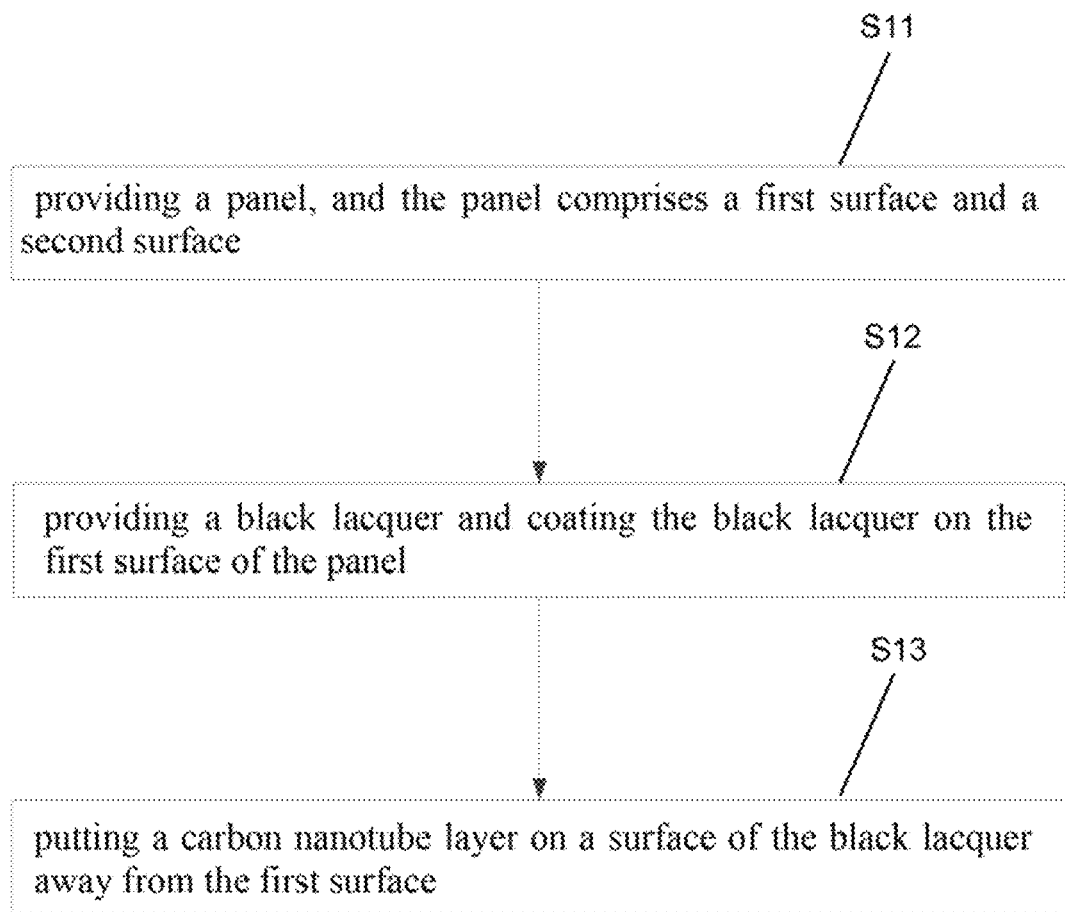
FIG. 6 is a flow diagram of a method of making the cavity blackbody radiation source in FIG. 5.

FIG. 6 shows a method of making a plane source blackbody, in one embodiment. The method comprises:
  block (B11), providing a panel, and the panel comprises a first surface and a second surface;
  block (B12), providing a black lacquer and coating the black lacquer on the first surface of the panel;
  block (B13), putting a carbon nanotube layer on a surface of the black lacquer away from the first surface.

In block (B11), the panel is a flat structure. A material of the panel is an aluminum alloy. The first surface is opposite to the second surface.

In block (B12), the black lacquer has high emissivity, such as Pyromark 1200 black lacquer having an emissivity 0.92, Nextel Velvet 811-21 black lacquer having an emissivity 0.95. In one embodiment, the black lacquer is the Nextel Velvet 811-21 black lacquer having the emissivity 0.95.

In block (B13), the carbon nanotube layer comprises ten drawn carbon nanotube films stacked with each other, and the carbon nanotubes of adjacent drawn carbon nanotube films are vertically crossed to form a plurality of micropores. Putting the carbon nanotube layer on the surface of the black lacquer and drying, the carbon nanotube layer is adhered to the first surface of the panel by the black lacquer.

A thickness of the black lacquer can not be too small or too large. When the thickness of the black lacquer is too small, a binding force between the carbon nanotube layer and the first surface is weak, and the carbon nanotube layer cannot be firmly fixed to the first surface. On the contrary, when the thickness of the black lacquer is too large, the carbon nanotube layer is embedded in the black lacquer, therefore, a structure of the carbon nanotube layer is destroyed, and a high emissivity of the carbon nanotube layer cannot be exhibited. In one embodiment, the carbon nanotube layer is not completely submerged in the black lacquer, a part of the carbon nanotube layer is submerged in the black lacquer and another part of the carbon nanotube layer is located on the surface of the black lacquer.

In one embodiment, the method further comprises putting the heating element on the second surface of the panel 11, and the plane source blackbody 10 can be heated in real time.

The plane source blackbody in this disclosure has many advantages. First, carbon nanotubes are currently the darkest material in the world, the emissivity of carbon nanotubes is 99.6%, which is far larger than that of currently surface material of the plane source blackbody. For example, an emissivity of the Nextel Velvet 81-21 black lacquer is only 96%.

Second, the micropores in the carbon nanotube layer can prevent the incident light being reflected from the surface of the carbon nanotube layer, so the emissivity of the carbon nanotube layer is further improved.

Third, the black lacquer is located between the first surface and the carbon nanotube layer, therefore, the carbon nanotube layer can be more firmly bonded to the first surface of the panel. Furthermore, the black lacquer is a high emissivity material, so that the emissivity of the plane source blackbody can be further improved.

Fourth, the carbon nanotubes can be prepared by a chemical vapor deposition of carbon source gas under high temperature conditions, and the raw materials are cheap and easy to obtain.

Fifth, the carbon nanotubes have excellent thermal conductivity, using the carbon nanotube layer as the surface material of the plane source blackbody can improve the temperature uniformity and stability of the plane source blackbody.

Sixth, the carbon nanotubes have excellent mechanical properties. The use of carbon nanotube materials to prepare plane source blackbody can increase the stability of the plane source blackbody, and make the star borne blackbody not easy to damage in harsh environments.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:
1. A plane source blackbody consisting of:
  a panel comprising a first surface and a second surface opposite to the first surface;
  a black lacquer coated on the first surface; and
  a carbon nanotube layer located on a surface of the black lacquer away from the first surface, wherein the carbon nanotube layer consists of a plurality of carbon nanotubes, the carbon nanotube layer is fixed on the first surface by the black lacquer, and the carbon nanotube layer is an emissivity source; and the carbon nanotube layer defines a third surface and a fourth surface opposite to the third surface, the third surface is submerged in the black lacquer, and the fourth surface is exposed outside of the black lacquer;
  a heating element located on the second surface; and wherein the panel, black lacquer, and carbon nanotube layer are configured to have high blackbody emissivity when heated by the heating element.

2. The plane source blackbody of claim 1, wherein the carbon nanotube layer comprises at least one carbon nanotube film.

3. The plane source blackbody of claim 2, wherein the at least one carbon nanotube film is a drawn carbon nanotube film, a flocculated carbon nanotube film or a pressed carbon nanotube film.

4. The plane source blackbody of claim 2, wherein the carbon nanotube layer comprises at least two carbon nanotube films stacked with each other, and the at least two carbon nanotube films comprises at least two films of drawn carbon nanotube film, flocculated carbon nanotube film, and pressed carbon nanotube film.

5. The plane source blackbody of claim 3, wherein the drawn carbon nanotube film comprises a plurality of carbon nanotubes, and the plurality of carbon nanotubes are arranged substantially along a same direction.

6. The plane source blackbody of claim 5, wherein the carbon nanotube layer comprises ten drawn carbon nanotube films stacked with each other, and the carbon nanotubes of adjacent drawn carbon nanotube films are vertically crossed to form a plurality of micropores.

7. The plane source blackbody of claim 3, wherein the pressed carbon nanotube film comprises a plurality of carbon nanotubes, and the plurality of carbon nanotubes are isotropically arranged along a same or different directions.

8. The plane source blackbody of claim 3, wherein the flocculated carbon nanotube film comprises a plurality of carbon nanotubes, and a network structure is formed by the plurality of carbon nanotubes entangled with each other by Van der Waals force.

9. The plane source blackbody of claim 1, wherein the black lacquer is a Pyromark 1200 black lacquer or a Nextel Velvet 811-21 black lacquer.

10. The plane source blackbody of claim 1, wherein the heating element comprises a carbon nanotube structure, a first electrode and a second electrode, and the first electrode and the second electrode are located on a surface of the carbon nanotube structure and spaced apart from each other.

11. The plane source blackbody of claim 1, wherein a material of the panel is hard aluminum material, aluminum alloy material or oxygen-free copper.

12. A method of making a plane source blackbody consisting of:

step (S11), providing a panel comprising a first surface and a second surface, and a black lacquer;

step (S12), coating the black lacquer on the first surface of the panel;

step (S13), putting a carbon nanotube layer on a surface of the black lacquer away from the first surface, wherein the carbon nanotube layer consists of a plurality of carbon nanotubes, the carbon nanotube layer is fixed on the first surface by the black lacquer, and the carbon nanotube layer is an emissivity source, and the carbon nanotube layer defines a third surface and a fourth surface opposite to the third surface, the third surface is submerged in the black lacquer, and the fourth surface is exposed outside of the black lacquer; and providing a heating element located on the second surface, wherein the panel, black lacquer, and carbon nanotube layer are configured to have high blackbody emissivity when heated by the heating element.

13. The method of claim 12, wherein in step (S13), after putting the carbon nanotube layer on the surface of the black lacquer, drying the black lacquer to make the carbon nanotube layer adhered to the first surface of the panel by the black lacquer.

14. The plane source blackbody of claim 3, wherein the pressed carbon nanotube film comprises a plurality of micropores, and an aperture of each of the micropores is less than 10 microns.

15. The plane source blackbody of claim 3, wherein the flocculated carbon nanotube film comprises a plurality of micropores, and an aperture of each of the micropores is less than 10 microns.

16. The plane source blackbody of claim 1, wherein the carbon nanotube layer comprises a first portion and a second portion; and the first portion is submerged in the black lacquer, and the second portion is located on the surface of the black lacquer.

17. The plane source blackbody of claim 1, wherein the carbon nanotube layer comprises at least one drawn carbon nanotube film comprising randomly aligned carbon nanotubes, and contacts exist between the randomly aligned carbon nanotubes and adjacent carbon nanotubes.

18. The plane source blackbody of claim 12, wherein a material of the panel is hard aluminum material, aluminum alloy material or oxygen-free copper.

* * * * *